United States Patent
Baticci et al.

(10) Patent No.: US 11,741,923 B2
(45) Date of Patent: Aug. 29, 2023

(54) DEVICE FOR DETECTING THE GRIP PATTERN WHEN PLAYING A BOWED INSTRUMENT, AND BOWED INSTRUMENT COMPRISING SUCH A DEVICE

(71) Applicants: Alessandro Baticci, Vienna (AT); Rafal Zalech, Vienna (AT)

(72) Inventors: Alessandro Baticci, Vienna (AT); Rafal Zalech, Vienna (AT)

(73) Assignee: C. BECHSTEIN PIANOFORTE AKTIENGESELLSCHAFT, Berlin (DE)

( * ) Notice: Subject to any disclaimer, the term of this patent is extended or adjusted under 35 U.S.C. 154(b) by 0 days.

(21) Appl. No.: 17/756,613

(22) PCT Filed: Nov. 27, 2020

(86) PCT No.: PCT/AT2020/060422
§ 371 (c)(1),
(2) Date: May 27, 2022

(87) PCT Pub. No.: WO2021/102499
PCT Pub. Date: Jun. 3, 2021

(65) Prior Publication Data
US 2022/0415293 A1    Dec. 29, 2022

(30) Foreign Application Priority Data
Nov. 29, 2019 (AT) .............................. A 51043/2019

(51) Int. Cl.
*G10H 1/34* (2006.01)
*G10D 1/02* (2006.01)
(Continued)

(52) U.S. Cl.
CPC ............... *G10H 1/342* (2013.01); *G10D 1/02* (2013.01); *G10D 3/06* (2013.01); *G10H 1/0008* (2013.01);
(Continued)

(58) Field of Classification Search
CPC . G10H 1/342; G10D 1/02; G10D 3/06; H04R 1/46
See application file for complete search history.

(56) References Cited

U.S. PATENT DOCUMENTS 3,694,559 A  *  9/1972  Suzuki ................. G10H 1/0558
                                                  984/321
4,805,510 A  *  2/1989  De Dianous ........... G10H 1/342
                                                  84/723
(Continued)

FOREIGN PATENT DOCUMENTS

FR         2598017 A1    10/1987

OTHER PUBLICATIONS

Austrian Office Action; Application No. A 51043/2019; Completed: Jul. 3, 2020; dated Jul. 8, 2020; 1 Page.
(Continued)

*Primary Examiner* — Robert W Horn
(74) *Attorney, Agent, or Firm* — Husch Blackwell LLP (57) ABSTRACT

A device for detecting the grip pattern when playing a bowed instrument, having a sensor film arrangeable on the fingerboard for detecting the grip pattern. The sensor film is formed from at least one resistance layer, a conductive layer and a spacer layer arranged in-between, and having an evaluation circuit, by which evaluation circuit the resistance changes of the sensor film caused by the grip pattern are able to be detected. The resistance layer is divided into a number of resistance tracks corresponding to the number of strings of the bowed instrument. The width of each resistance track
(Continued)

is formed increasing from one end of the sensor film to the other end of the sensor film, and the upper layer of the sensor film is formed by the conductive layer, and the sensor film has a curvature, corresponding to the arch of the fingerboard.

20 Claims, 7 Drawing Sheets

(51) Int. Cl.
    *G10D 3/06*     (2020.01)
    *G10H 1/00*     (2006.01)
    *H04R 1/46*     (2006.01)

(52) U.S. Cl.
    CPC ......... H04R 1/46 (2013.01); *G10H 2220/391* (2013.01)

(56) References Cited

U.S. PATENT DOCUMENTS

| | | | | |
|---|---|---|---|---|
| 5,117,730 A * | 6/1992 | Yamauchi | G10H 1/055 | |
| | | | | 84/723 |
| 5,140,887 A * | 8/1992 | Chapman | G10H 1/342 | |
| | | | | 84/646 |
| 7,385,125 B2 * | 6/2008 | Motsenbocker | G10H 3/185 | |
| | | | | 84/307 |
| 8,003,877 B2 * | 8/2011 | Elion | G10H 1/0066 | |
| | | | | 84/646 |
| 8,242,345 B2 * | 8/2012 | Elion | G10H 1/0066 | |
| | | | | 84/646 |
| 8,987,577 B2 * | 3/2015 | Eventoff | G10H 1/0558 | |
| | | | | 84/723 |
| 9,214,146 B2 * | 12/2015 | Eventoff | G10H 3/181 | |
| 9,243,950 B2 * | 1/2016 | Raniere | B60R 13/08 | |
| 9,361,870 B2 * | 6/2016 | Eventoff | G10H 1/34 | |
| 9,589,554 B2 * | 3/2017 | Eventoff | G10H 3/182 | |
| 9,767,706 B2 * | 9/2017 | Hsu | G09B 15/06 | |
| 9,842,578 B2 * | 12/2017 | Eventoff | G10H 3/00 | |
| 10,181,311 B2 * | 1/2019 | Eventoff | G10H 3/181 | |
| 10,224,015 B2 * | 3/2019 | Hsu | G10H 1/342 | |
| 10,810,982 B2 * | 10/2020 | Hiraiwa | G10H 1/344 | |
| 2009/0260508 A1 | 10/2009 | Elion | | |
| 2011/0011248 A1 | 1/2011 | Elion | | |
| 2014/0060290 A1 * | 3/2014 | Wallace | G10H 1/0551 | |
| | | | | 84/733 |
| 2022/0415293 A1 * | 12/2022 | Baticci | G10D 1/02 | |
| 2023/0024727 A1 * | 1/2023 | Grafman | G10H 1/342 | |

OTHER PUBLICATIONS

Austrian Search Report; Application No. A 51043/2019; Completed: Jul. 3, 2020; dated Jul. 8, 2020; 2 Pages.

International Search Report and Written Opinion of the International Searching Authority; Application No. PCT/AT2020/060422; Completed: Feb. 18, 2021; dated Mar. 1, 2021; 11 Pages.

\* cited by examiner

DEVICE FOR DETECTING THE GRIP PATTERN WHEN PLAYING A BOWED INSTRUMENT, AND BOWED INSTRUMENT COMPRISING SUCH A DEVICE

TECHNICAL FIELD

The present teaching relates to a device for detecting the grip pattern when playing a bowed instrument having at least two strings, which are stretched between a scroll and a bridge over an arched fingerboard, having a sensor film arrangeable on the fingerboard for detecting the grip pattern, which sensor film is formed from at least one resistance layer, a conductive layer and a spacer layer arranged in-between, and having an evaluation circuit connected to the sensor film, by which evaluation circuit the resistance changes of the sensor film caused by the grip pattern are able to be detected. The present teaching also relates to a bowed instrument, in particular a violin, having at least two strings stretched over an arched fingerboard between a scroll and a bridge, with such a device.

BACKGROUND

From the prior art, devices are known for detecting the finger position in bowed instruments, the central element of which is a sensor film placed on the fingerboard. For example, the sensor film consists of printed conductor tracks, one under each string of the bowed instrument, a Velostat layer placed thereabove, and a spacer layer, which is formed from strips arranged between the conductor tracks. During playing of the bowed instrument, a contact is produced between the Velostat layer and the conductor track by the pressure of the fingers onto the fingerboard. A resistance value, dependent of the finger position, can be measured via a corresponding electric circuit, by means of a voltage measurement with impressed current. The measurement of the resistance values usually takes place chronologically in succession. The thickness of the sensor film, which excludes a placing on the bowed instrument owing to the small distance between strings and fingerboard, frequently presents a problem. For the placing of such a sensor film, a raising of the saddle or respectively a lower arrangement of the fingerboard itself would be necessary which, however, could lead to an impairment of the instrument and therefore of the feel when played.

In US 2009/0260508 A1 a device is illustrated for detecting the grip patterns when playing a musical instrument having a fingerboard. The electronic fingerboard comprises a conductive layer, a resistance layer and a spacer layer arranged in-between. The played note is established by the resistance of the resistance layer, which is defined by the finger position on the fingerboard. An application on bowed instruments which have a curvature of the fingerboard in a direction transversely to the longitudinal direction is not described.

U.S. Pat. No. 5,117,730 A describes an electronic device for use in a bowed instrument, wherein sensors with resistance tracks are arranged for detecting the grip pattern on the fingerboard.

SUMMARY

One problem of the present teaching consists in the creation of a device for detecting the grip pattern when playing a bowed instrument, and a bowed instrument comprising such a device, by which as precise and rapid a detection of the grip pattern as possible is enabled, and which does not bring about any negative influence when playing the musical instrument. Disadvantages of the prior art are to be eliminated or at least improved.

This problem is solved by an above-mentioned device, wherein the lower layer of the sensor film, facing the fingerboard in mounted state, is formed by the resistance layer, which resistance layer is divided into a number of resistance tracks corresponding to the number of strings of the bowed instrument, wherein the width of each resistance track is formed increasing from one end of the sensor film, which in the mounted state faces the scroll, to the other end of the sensor film, which in the mounted state faces the bridge, and the upper layer of the sensor film, facing away from the fingerboard in the mounted state, is formed by the conductive layer, and the sensor film has a curvature, corresponding to the arch of the fingerboard, in a direction transversely to the longitudinal direction.

The advantage of this embodiment with a resistance layer divided into individual resistance tracks lies in that the grip pattern of all the strings can be detected simultaneously, and the resistance of each resistance track can be read simultaneously. The subject of the present teaching enables a precise and rapid measurement of the grip pattern or respectively of the positions of the fingers on each individual string and prevents a possible influencing of the measurements at the individual strings with respect to one another, as the resistance tracks are separated from one another.

The embodiment of the individual resistance tracks, according to the present teaching, which have an increasing width in the course from the scroll to the bridge of the bowed instrument, has the advantage that a larger contact area is available for detecting the finger positions in the range of higher notes, where a greater transversal movement or deflection of the strings is common. Through the wider contact area in the region of the fingerboard, which lies nearer to the bridge, it is possible to also detect grips in which the finger positions on the fingerboard are displaced transversely to the string.

Through the fact that the prefabricated sensor film already has a curvature, corresponding to the arch of the fingerboard, in a direction transversely to the longitudinal direction, it can be guaranteed that also with a mounted sensor film a substantially constant distance results between the resistance tracks and the conductor track in transverse direction. Thereby, the sensor film can be embodied to be particularly thin, whereby a subsequent placing on the bowed instrument is possible without a negative influence for the musician and the instrument. If the sensor film were prefabricated flat, on applying onto the arched fingerboard tensions and different distances between the layers of the sensor film result, up to possible short-circuits between the conductive layer and the resistance tracks. In order to prevent such short-circuits, the spacers between the conductive layer and the resistance layer would have to be embodied thicker, whereby the overall thickness of the sensor film would be increased. Through the arch of the sensor film according to the present teaching, which is already taken into consideration in the manufacture, the mentioned disadvantages can be prevented that the spacers can be embodied thinner, without a risk of short-circuits or unwanted contact-connections of the conductive layer with the resistance layer.

The detection device which is represented can be used, on the one hand, to achieve via the determined grip pattern a real time control of virtual and synthetic sounds, and for the real time recording of pitches in the common software programs for digital notation. On the other hand, the detection device according to the present teaching can also be used for training purposes, in order to generate feedback to the fingered pitches. A combination of the detection device with a learning software, designed for this, on a personal computer, is also conceivable, which can facilitate a detecting of the grip pattern on the instrument.

In a preferred embodiment, the device has an evaluation circuit with several inputs, the number of which corresponds at least to the number of resistance tracks which serve for the parallel connection of the individual resistance tracks of the sensor film with the evaluation circuit and enable a parallel processing of the grip pattern. Through the parallel evaluation of the individual resistance tracks in the evaluation circuit, the positions of the individual fingers can be detected simultaneously without use of a multiplexer. Thereby, the detection speed can be increased and a detection of the grip pattern can be achieved quasi in real time.

Advantageously, the sensor film has in longitudinal direction a partial region which has a smaller thickness than the thickness of the remaining sensor film, The partial region with smaller thickness is preferably situated at the region of the sensor film facing the scroll. Usually, through the very small distance between string and fingerboard of a bowed instrument, minimal space is available for the sensor film in the region of the scroll. The smaller height of the sensor film in this partial region facilitates the subsequent arranging of the sensor film on the fingerboard, without further structural provisions (for example a raising of the saddle) being necessary, which can influence the characteristics when playing the bowed instrument.

In an embodiment, the partial region of the sensor film with smaller thickness is formed by a thinner spacer layer, which is able to be implemented particularly easily and at a favourable cost with regard to manufacturing technology.

In an alternative embodiment, the sensor film has a thickness decreasing linearly from the scroll in the direction of the bridge. This indeed increases the manufacturing effort through the specially configured spacer layers, but enables an optimum adaptation to the geometric conditions of the bowed instrument and an optimum detection of the grip pattern.

In a preferred embodiment of the detection device, the width of each resistance track of the sensor film is formed increasing linearly from one end of the sensor film, which in the mounted state faces the scroll, to the other end of the sensor film, which in the mounted state faces the bridge. This facilitates the manufacture, as the strips of the spacer layer, which establish the distance between the conductive layer and the resistance layer, can be embodied straight. In addition, in this way a simpler correlation can be achieved between the resistance of the resistance layer and the finger position. This non-linear relationship between the measured resistance values to the respective finger position and thus to the resulting frequency of the respective string can be linearized with corresponding correction tables or functions.

Preferably, the resistance layer of the sensor film contains carbon. This has the advantage, compared to a piezoresistive material, that the resistance value is independent of pressure. Thereby, a more precise detection of the finger position is possible, as the resistance value is better able to be reproduced.

Advantageously, the conductive layer of the sensor film consists of silver or contains silver. Through the characteristic high conductivity of silver, the conductive layer still has a low resistance value even with a very small layer thickness.

In a preferred embodiment of the device, the spacer layer of the sensor film consists of individual strips of plastic, in particular polyimide or polyamide, which are preferably provided with an adhesive layer on both sides. These individual strips are placed between the conductor tracks. An advantage of these strips made of plastic is that thereby the necessary insulation between resistance layer and conductive layer can be produced in a simple manner. Furthermore, such materials are favourably priced and are able to be processed easily.

In a further embodiment, carbon is applied onto one side of the conductive layer. The carbon is applied here on the side which lies opposite the side which is coated with a conductive material. A transparent cover layer is preferably placed onto this outer carbon layer. Thereby, the appearance of the surface of the fingerboard of the bowed instrument is not substantially influenced by the sensor film which is arranged thereon.

Preferably, an adhesive layer is arranged on the resistance layer of the sensor film facing the fingerboard in the mounted state, which adhesive layer enables the sensor film to be placed rapidly, easily, uniformly and in a flat manner on the fingerboard. With a choice of suitable adhesives, the sensor film can also be removed from the fingerboard again without leaving a residue.

In order to alter the feel for the instrument as little as possible during playing, it is advantageous if the sensor film has a minimal thickness less than 0.7 mm, preferably less than 0.5 mm, particularly preferably less than 0.35 mm. In particular in the partial region of the fingerboard facing the scroll, the use of a particularly thin sensor film is important.

According to a further feature of the present teaching, the evaluation circuit contains a microcontroller. Thereby, it is possible to directly preprocess the detected resistance values.

In addition, the evaluation circuit can be connected to a transmitter, which transmits the detected resistance values to a corresponding receiver. The transmitter can be embodied here for example as a Bluetooth®- or Wifi-transmitter, which can be already integrated in the microcontroller. The transmitted data can be transmitted therewith to an external apparatus and further processed or recorded, or they can be transmitted to an audio output apparatus for direct playing.

Advantageously, the evaluation circuit is additionally connected to an interface for the transfer of the data from the evaluation circuit or for the programming of individual parts of the evaluation circuit, in particular of the microcontroller.

In a further embodiment, a motion sensor is provided for detection of the translatory motion, in particular a 3D gyroscope, and is connected to the evaluation circuit. Thereby, in addition to the played music, the motion of the instrument, and thus of the player, can be recorded. Thereby, a player can be given additional feedback concerning his movement whilst playing.

According to a further feature, a microphone, in particular a contact microphone, is provided and is connected to the evaluation circuit. The played music can be recorded by the microphone and can be used to check the grips recorded by the sensor film, and hence notes, or also to calibrate the sensor film.

The problem according to the present teaching is also solved by an above-mentioned bowed instrument, in particular a violin, having at least two strings stretched over an arched fingerboard between a scroll and a bridge, in which an above-mentioned device is provided for detecting the grip pattern when playing. Such a bowed instrument has the advantage that the detected grip patterns which occur during playing can be detected particularly rapidly, at most with a very slight time delay, quasi in real time, as the information concerning the played note is determined with the pressure of the fingers onto the fingerboard and not through the digitally complex conventional pitch detection mechanisms. This can greatly reduce the delay time between the playing and the playback in the controlling of virtual or respectively synthetic sounds, which leads to an improved experience for the listeners. Concerning the further advantages which are able to be achieved, reference is to be made to the above description of the detection device.

Advantageously, the sensor film is stuck to the fingerboard. This enables a simple subsequent production of the bowed instrument which is equipped with the detection device.

BRIEF DESCRIPTION OF THE DRAWINGS

The present teaching is additionally explained further below with the aid of particularly preferred example embodiments, to which it is not to be restricted, however, and with reference to the drawings. The drawings show in detail.

DETAILED DESCRIPTION

Figure 1:
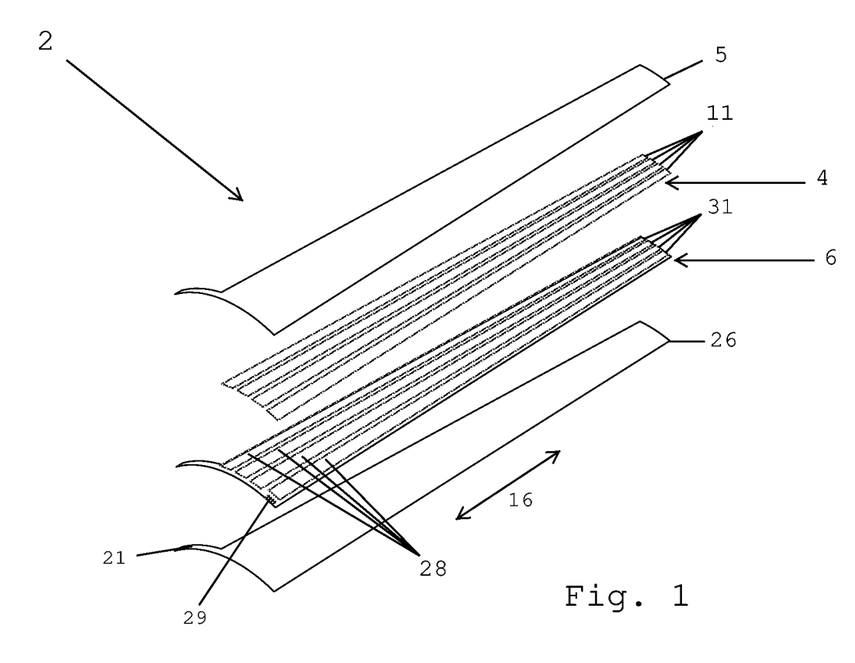
FIG. 1 schematically illustrates an exploded illustration of the sensor film.
Figure 7:
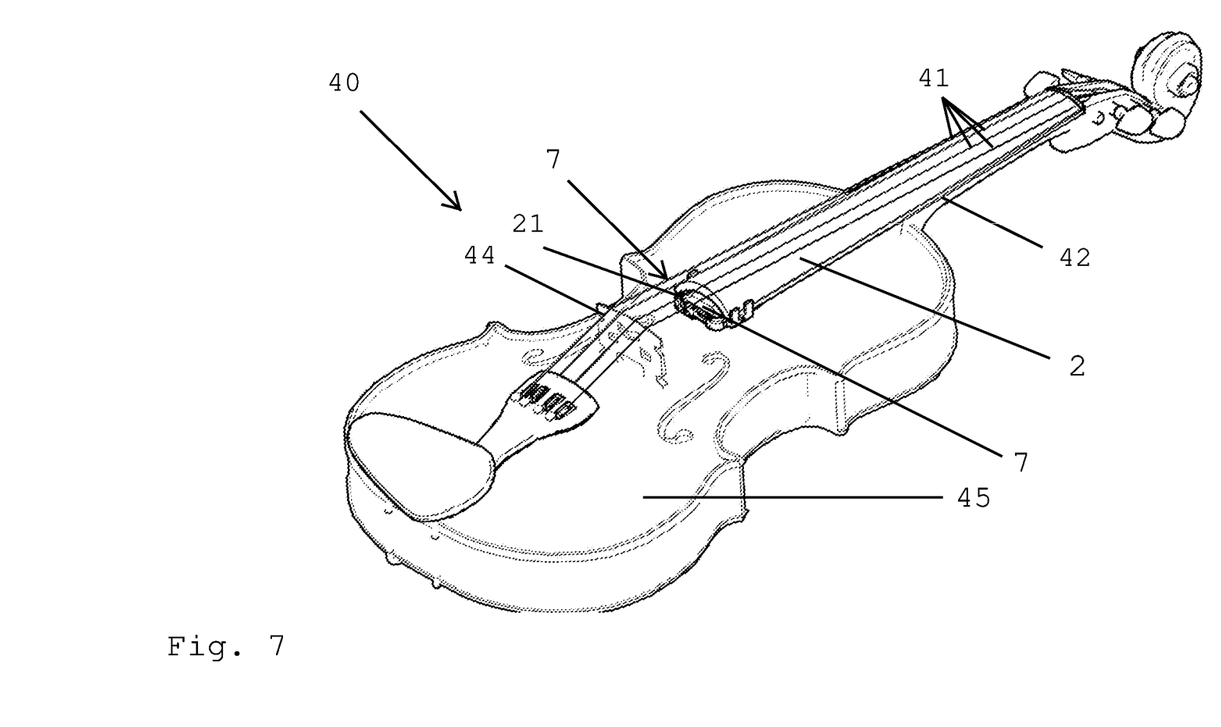
FIG. 7 illustrates a violin with a device according to the present teaching for detecting the grip pattern.

FIG. 1 shows an exploded illustration of the sensor film 2 for detecting the grip pattern when playing a bowed instrument 40 (see FIG. 7). The sensor film 2 consists at least of a conductive layer 5, spacer layer 6 and resistance layer 4. Optionally, in addition an adhesive layer 20 and a preferably transparent cover layer 13 can be included (see also FIG. 3). The connection of the sensor film 2 takes place via a contacting lug 21. The illustrated sensor film 2 is formed for the arrangement on a bowed instrument 40 with four strings and therefore has four resistance tracks 11 corresponding to the number of strings. The resistance layer 4 comprises for example a polyester film 26, onto which the resistance tracks 11 of the resistance layer 4 are placed. The spacer layer 6 consists of several plastic strips 31. Recesses 28 are arranged between the plastic strips 31, which recesses correspond to the shape and size of the resistance tracks 11. The spacer layer 6 can, in addition, have a small recess 29 for the contacting point 24, so that the latter can be connected to the conductive layer 5. The longitudinal direction 16 of the sensor film 2 is marked in the drawing, for orientation.

Figure 2:
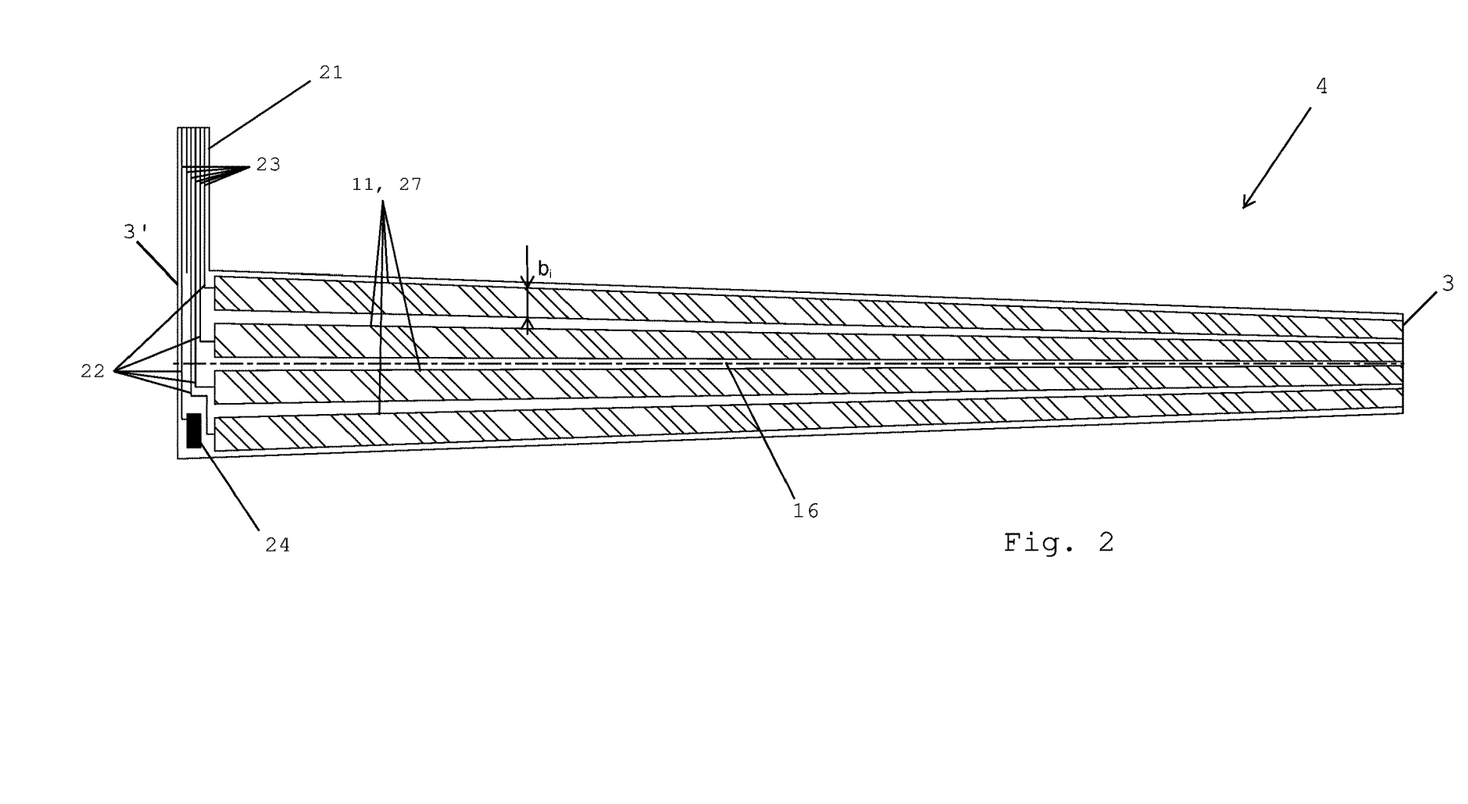
FIG. 2 schematically illustrates a top view onto the resistance layer of the sensor film.

FIG. 2 shows a top view of the resistance layer 4 with the printed resistance tracks 11, which preferably contain carbon 27. The width $b$, of the individual resistance tracks 11 is embodied increasing from the narrower end 3 of the sensor film 2, which in the mounted state faces the scroll 43 of the bowed instrument 40 (see FIG. 7), to the wider end 3', which in the mounted state faces the bridge 44 of the bowed instrument 40 (see FIG. 7). The width of the regions between the resistance tracks 11 remains constant here. Especially in the region of the strings 41, in which a greater clearance is present for a transverse movement of the string 41 (that is the region, situated nearer to the bridge 44, at the end 3' of the sensor film 2), the wider embodiment of the resistance tracks 11 is advantageous and finger positions can also be detected which are displaced transversely to the normal position of the string 41. Through the non-constant width $b$, of the resistance tracks 11, it is advantageous, for a linear correlation of the resistance values as a function of the respective grip position and thus frequency of the respective note produced by the string 41, to carry out a calibration or respectively a linearization. Here, for example, for all resistance tracks 11 the resistance values can be recorded and stored as a function of all or several possible grip positions and pitches which are able to be achieved thereby. By taking into consideration this non-linear correlation in the evaluation of the respective grip position, the course of the resistance to the respective grip position can be linearized. For this, on each string 41 any desired note is played and its frequency is detected for example with a microphone 9. This frequency is assigned to the finger position and thus to the length of the freely vibrating string 41. On the basis of this known frequency, the frequencies of all the other finger positions can be calculated. The contacting lug 21, described above, can also be seen. This has six outputs 23, wherein four of the outputs are connected to the four resistance tracks 11 via conductor tracks 22. In the illustrated example embodiment, an output 23 is not contacted and the sixth output 23 is connected to the silver coating 25 of the conductive layer 5 via the contacting point 24.

Figure 3:
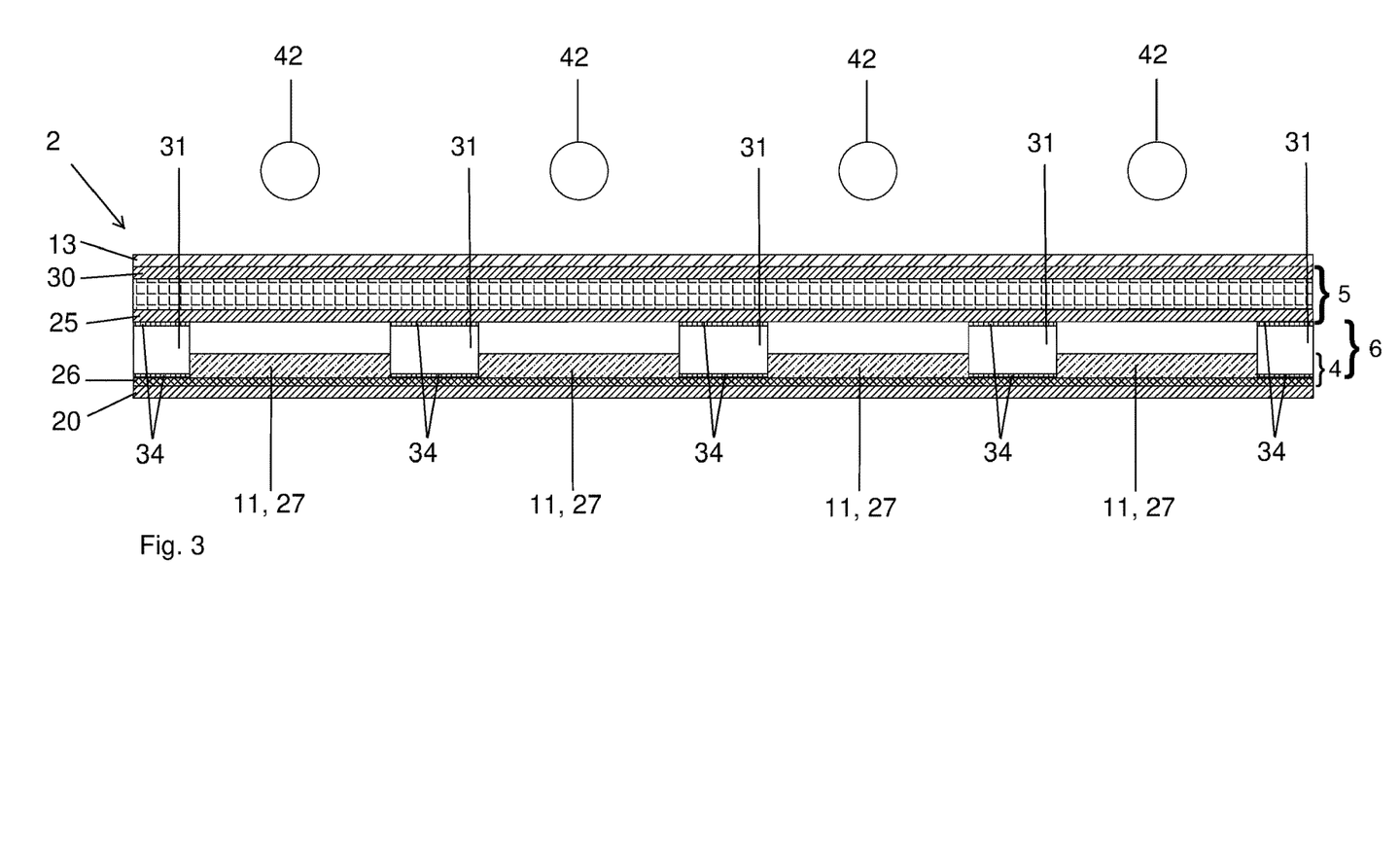
FIG. 3 schematically illustrates a section through the sensor film, transversely to the longitudinal direction.

FIG. 3 shows a section through the sensor film 2 transversely to the longitudinal direction 16, wherein the proportions which are shown do not correspond to reality, but rather serve for better demonstration. The illustrated embodiment of the sensor film 2 has an adhesive layer 20, thereabove the resistance layer 4 of the resistance tracks 11 of carbon 27 is situated, which can be applied on a polyester layer 26. Between the resistance tracks 11, individual plastic strips 31 are arranged in the spacer layer 6, which are preferably provided with an adhesive layer 34 on both sides. The conductive layer 5 is situated thereabove, which is provided on its underside with a silver coating 25 and on its upper side with a carbon layer 30. A transparent cover layer 13 can be arranged over the carbon layer 30. The strings 42 of a bowed instrument 40 are illustrated over the sensor film 2.

Figure 4A:
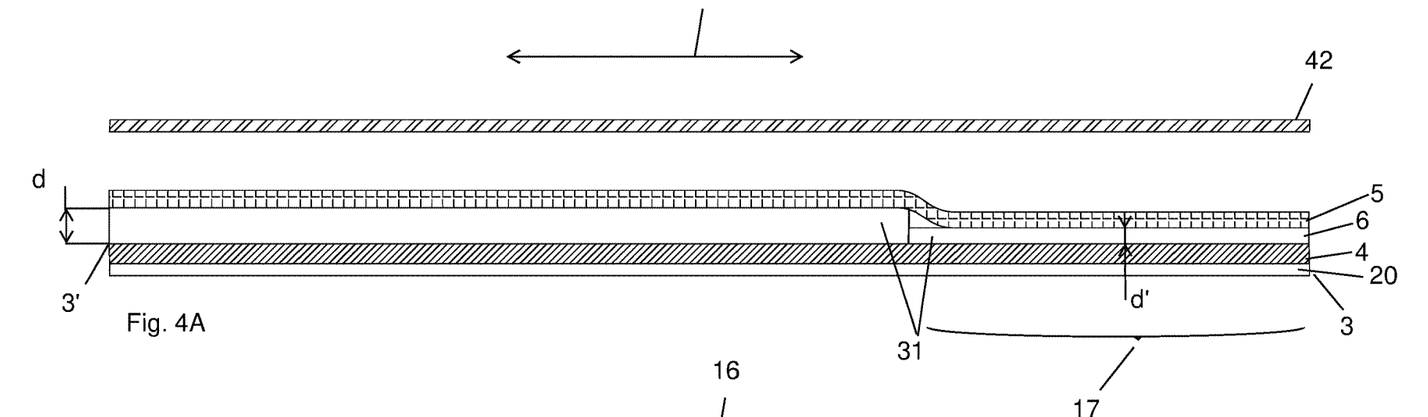
FIG. 4A schematically illustrates a section through a sensor film with a thickness running in a stepped manner in longitudinal direction.
Figure 4B:
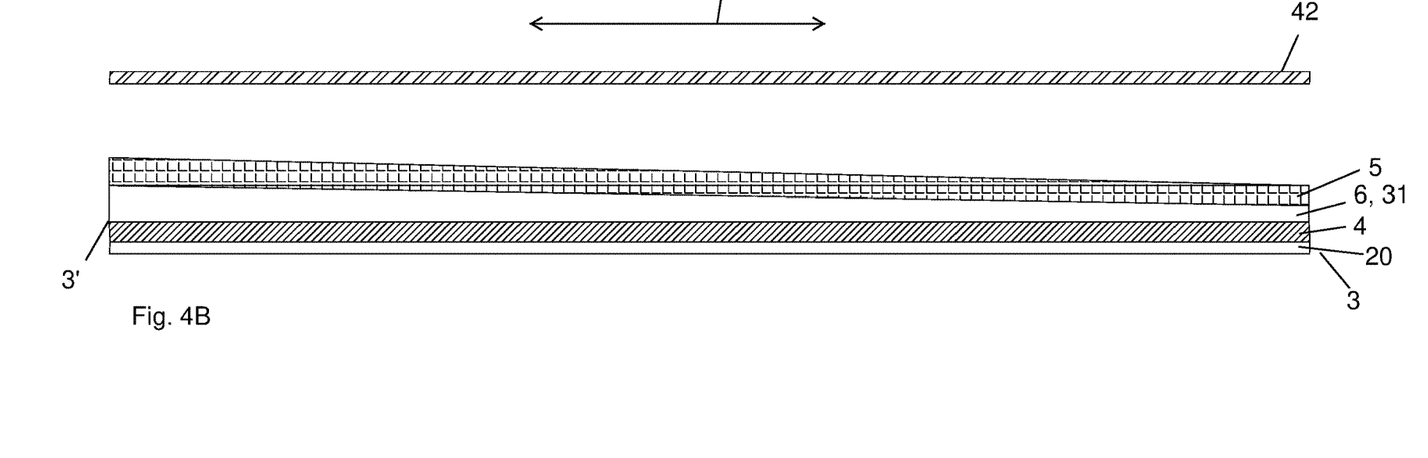
FIG. 4B schematically illustrates a section through a sensor film with linear course of the thickness in longitudinal direction.

FIGS. 4A and 4B show respectively a section through a sensor film 2 in longitudinal direction 16. FIG. 4A shows here a sensor film 2 with two partial regions, wherein a partial region 17 has a smaller thickness d' than the thickness d of the remaining sensor film 2. The transition 32 takes place here in a stepped manner and results through a stepped change in the thickness of the spacer layer 6. FIG. 4B likewise shows the section through a sensor film 2 in longitudinal direction 16. In this embodiment, the thickness of the sensor film 2 is configured in a linearly decreasing manner from the end 3' to the end 3. The string 42 of a bowed instrument 40 is illustrated above the sensor film 2.

Figure 5:
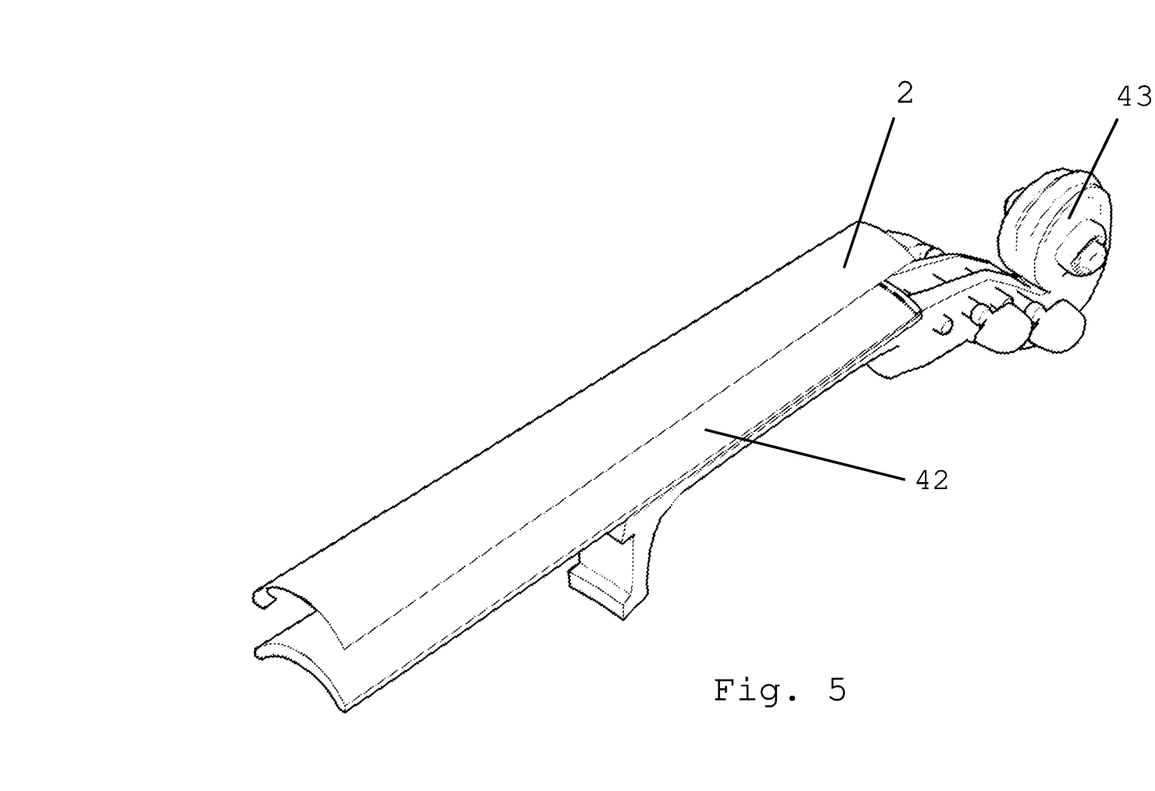
FIG. 5 schematically illustrates a sensor film prefabricated in a curved manner.

FIG. 5 shows a sensor film 2, prefabricated in a curved manner. The fingerboard 42 of a bowed instrument 40 is illustrated under the sensor film 2. In order to enable a curvature corresponding to the arch of the fingerboard 42 already during the manufacture of the sensor film 2, for example firstly the resistance layer 4 and the spacer layer 6 are connected to one another. In the next step, the conductive layer 5 is connected to the spacer layer 6 at a lateral edge in longitudinal direction 16. Thereafter, the lower part of the sensor film 2 (consisting of resistance layer 4 and spacer layer 6) is applied onto a substrate, for example by a detachable adhesion, postformed to the fingerboard 42 of a bowed instrument 40. In a final step, the conductive layer 5 is connected, in particular stuck, to the spacer layer 6, and any remaining overhang is separated off. After this prefabricating, the sensor film 2 has a desired curvature which corresponds to the arch of the fingerboard 42. Thereby, in transverse direction of the sensor film 2 a substantially constant distance is achieved between resistance layer 4 and conductive layer 5 and thus identical characteristics of the sensor film 2 over the entire width. The sensor film 2 which is produced in such a way can be placed on the fingerboard 42, in particular stuck thereto, and is substantially tension-free in this curved state.

Figure 6:
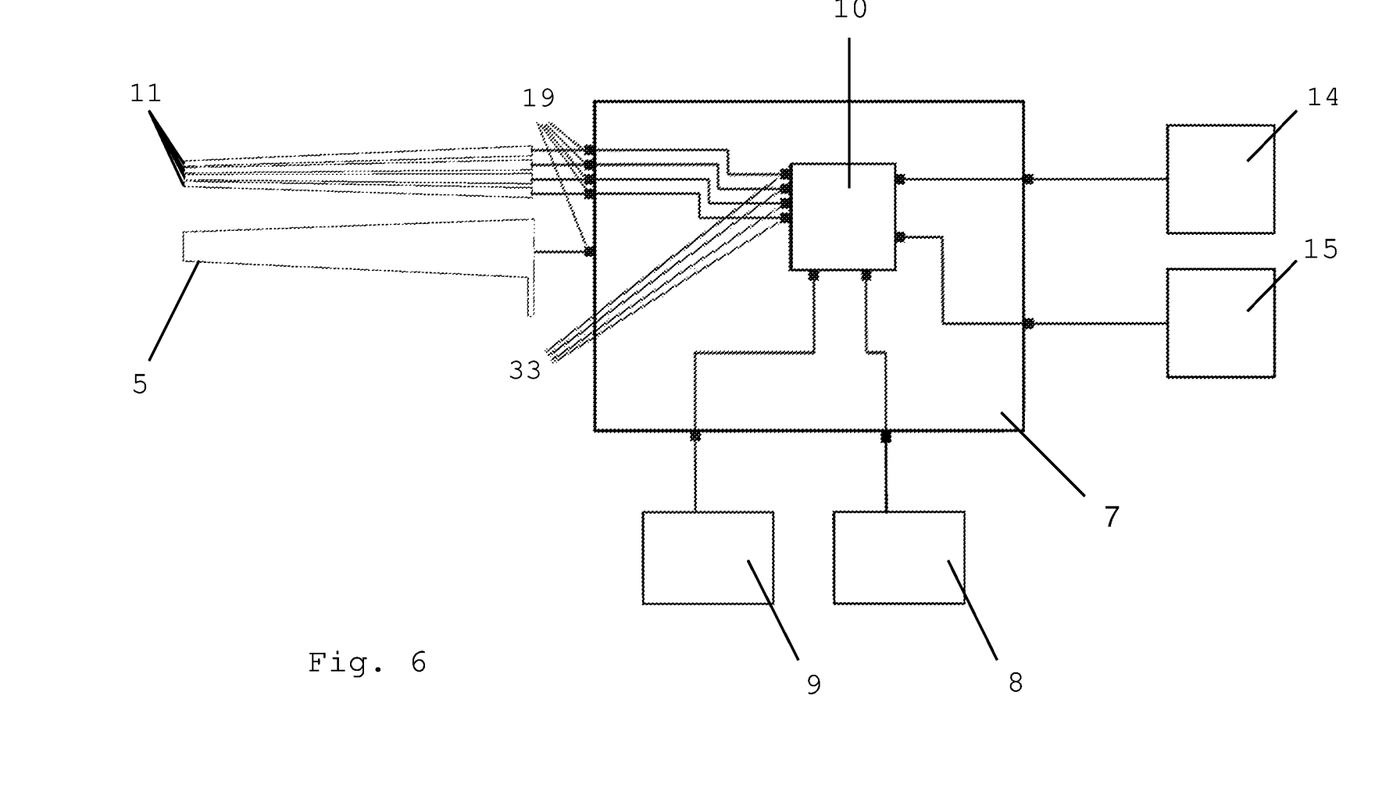
FIG. 6 illustrates a block diagram of an embodiment of the detection device.

FIG. 6 shows a block diagram of the device 1 for detecting the grip pattern when playing a bowed instrument 40. The resistance tracks 11 of the resistance layer 4 are connected here respectively separately with inputs 19 of the evaluation circuit 7. The conductive layer 5 is also connected to the evaluation circuit 7. A microcontroller 10 is situated as central element in the evaluation circuit 7, wherein each of the four resistance tracks 11 (illustrated here) is connected to respectively an input 33 of the microcontroller 10 via the evaluation circuit 7. Thereby, a parallel evaluation of the individual resistances is possible. Furthermore, a transmitter 14, an interface 15, a motion sensor 8 or a microphone 9 can be connected to the evaluation circuit 7 or respectively to the microcontroller 10. The transmitter 14 can serve to transmit the data, determined by the device 1, to corresponding external receivers for recording or further processing. Likewise, the interface 15 can serve for data transmission, but also for programming the microcontroller 10. A motion sensor 8 connected to the evaluation circuit 7 can be used for recording the movement of the bowed instrument 40, and thus of the player. The player can thereby be given further feedback concerning his playing style. The microphone 9 can be used for determining the played notes. By means of the notes recorded with the microphone 9 the grips, determined via the sensor film 2, can be checked or the entire device 1 can be calibrated or respectively the resistance characteristic can be linearized.

FIG. 7 shows a bowed instrument 40, in this case a violin, having a device 1 according to the present teaching for detecting the grip pattern. The sensor film 2 is applied on the fingerboard 42. The sensor film 2 has resistance tracks 11 which become wider running linearly from the scroll 43 in the direction of the bridge 44. The resistance tracks 11 run in a straight line under the strings 41 of the bowed instrument 40. The evaluation circuit 7 is placed on the resonance body 45 of the bowed instrument 40 under the fingerboard 42, close to the bridge 44, but can also be placed in the resonance body. Likewise, a microphone 9 (not illustrated here), which is connected to the evaluation circuit 7, can be placed on or in the resonance body. The volume and the frequency of the played notes can be recorded with the microphone 9. The evaluation circuit 7 is connected to the sensor film 2 via the contacting lug 21 (see also FIG. 1).

The invention claimed is:

1. A device for detecting grip pattern when playing a bowed instrument, having:
    at least two strings, which are stretched between a scroll and a bridge over an arched fingerboard,
    a sensor film arrangeable on the fingerboard for detecting the grip pattern, which sensor film is formed from at least one resistance layer, a conductive layer and a spacer layer arranged in-between, and
    an evaluation circuit, connected to the sensor film, by which evaluation circuit the resistance changes of the sensor film caused by the grip pattern are able to be detected,
    wherein the lower layer of the sensor film, facing the fingerboard in mounted state, is formed by the resistance layer, which resistance layer is divided into a number of resistance tracks corresponding to the number of strings of the bowed instrument,
    the upper layer of the sensor film, facing away from the fingerboard in the mounted state, is formed by the conductive layer,
    a width of each resistance track is formed increasing linearly from one end of the sensor film, which in the mounted state faces the scroll, to the other end of the sensor film, which in the mounted state faces the bridge,
    the sensor film has a curvature, corresponding to the arch of the fingerboard, in a direction transversely to the longitudinal direction, so that in transverse direction of the sensor film a substantially constant distance results between the resistance tracks and the conductive layer, and
    the evaluation circuit has several inputs for parallel connection to each resistance track of the sensor film and for parallel processing of the grip pattern.

2. The device according to claim 1, wherein the sensor film has in longitudinal direction a partial region which has a smaller thickness than the thickness of the remaining sensor film.

3. The device according to claim 2, wherein the partial region of the sensor film with the smaller thickness is formed by a thinner spacer layer.

4. The device according to claim 1, wherein the thickness of the sensor film is formed decreasing linearly from an end of the sensor film, which in the mounted state faces the scroll, to the other end of the sensor film, which in the mounted state faces the bridge.

5. The device according to claim 1, wherein the resistance layer of the sensor film contains carbon.

6. The device according to claim 1, wherein the conductive layer of the sensor film contains silver.

7. The device according to claim 1, wherein the spacer layer of the sensor film consists of individual strips of plastic, and is provided with an adhesive layer on both sides.

8. The device according to claim 1, wherein a transparent cover layer is arranged over the conductive layer.

9. The device according to claim 1, wherein an adhesive layer is arranged on the resistance layer of the sensor film facing the fingerboard in the mounted state.

10. The device according to claim 1, wherein the sensor film has a minimal thickness less than 0.7 mm.

11. The device according to claim 1, wherein the evaluation circuit contains a microcontroller.

12. The device according to claim 1, wherein the evaluation circuit is connected to a transmitter.

13. The device according to claim 1, wherein the evaluation circuit is connected to an interface.

14. The device according to claim 1, wherein a motion sensor is provided for detection of the translatory movement, and is connected to the evaluation circuit.

15. The device according to claim 1, wherein a microphone is provided and is connected to the evaluation circuit.

16. A bowed instrument, having at least two strings stretched over an arched fingerboard between a scroll and a bridge, wherein a device according to claim 1 is provided for detecting grip pattern when playing the bowed instrument.

17. The bowed instrument according to claim 16, wherein the sensor film is stuck on the fingerboard.

18. The device according to claim 1, wherein the sensor film has a minimal thickness less than 0.35 mm.

19. The device according to claim 1, wherein the individual strips of plastic comprise polyimide or polyamide.

20. A violin, comprising:
- at least two strings stretched over an arched fingerboard between a scroll and a bridge, and
- a device according to claim 1 for detecting grip pattern when playing the violin.

\* \* \* \* \*